United States Patent Office 2,749,362
Patented June 5, 1956

2,749,362

PROCESS FOR THE DECOLORIZATION AND PURIFICATION OF p-HYDROXYBENZOIC ACID

Rene P. Berni, Union City, N. J., assignor to Heyden Chemical Corporation, New York, N. Y., a corporation of Delaware No Drawing. Application June 18, 1952,
Serial No. 294,275

5 Claims. (Cl. 260—521)

This invention relates to p-hydroxybenzoic acid, and more specifically, to a new and improved method for the purification and decolorization of p-hydroxybenzoic acid.

p-Hydroxybenzoic acid is manufactured by the Kolbe-Schmitt synthesis which involves passing carbon dioxide over hot dry potassium phenate to form an addition compound, potassium phenyl carbonate, which, at a temperature of 200° C., undergoes a molecular rearrangement. The negative radical attached to the oxygen atom migrates to the ring and in doing so takes the para position. On the addition of an acid to the aqueous solution of the salt, p-hydroxybenzoic acid is obtained.

The above described reaction is represented by the following equation:

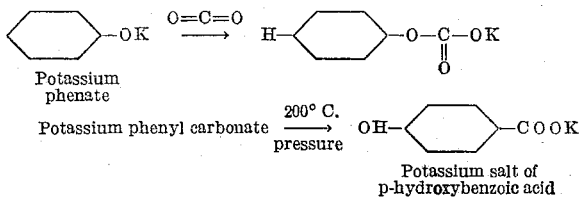

In the preparation of p-hydroxybenzoic acid by the Kolbe-Schmitt synthesis, certain impurities are formed which tend to discolor the product and the subsequent compounds prepared from it. For example, the acid is often too dark for use in the manufacture of derivatives employed in the preparation of cosmetics and pharmaceutical products. Then again, the acid often fails to form a clear solution when dissolved in a weak alkaline solution.

A conventional process used in the decolorization of p-hydroxybenzoic acid may be described as follows:

The liquor obtained from the carboxylating unit is diluted with water until a 10% solution is obtained. After adjusting the solution to a pH of 7, it is then treated with an adsorption agent such as 1% carbon (the percentage is based on the weight of p-hydroxybenzoic acid) at a temperature ranging between 90°–100° C. for a period of one hour. The solution is then filtered, and adjusted to a pH of 4, treated at 70° C. for 0.4% sodium bisulfite, 0.8% zinc dust, and 1.6% carbon, filtered while hot and then acidified to a pH of 2. The solution is cooled to room temperature to precipitate the acid.

The product obtained by this procedure is highly unsatisfactory in that it possesses a color of APHA #70–85 and forms a turbid solution when it is dissolved in an alkaline solution.

(APHA colors are based on standards established by the American Public Health Association and are described in the publication "Standard Methods for the Examination of Water and Sewage" 8th edition, page 13 (1936). The colors reported in this application are 2% solutions of the acid in methanol.)

The process described herein represents a decided improvement over the art in that heat is not required in the reaction, the purification and decolorization being effected at about room temperature. Thus, decomposition of the reactants or the appearance of discoloring contaminants is avoided by conducting the reaction at a low temperature. Further, the process is relatively uninvolved and is not prolonged from the viewpoint of time since it involves only a few simple steps. Since further, colors obtained by this method range from APHA #20–35, as compared with colors of #70–85 obtained by the use of conventional methods.

In a more specific embodiment of this invention, an aqueous solution containing less than about 10% by weight of the potassium salt of p-hydroxybenzoic acid is acidified to a pH varying between 5.0 to 6.0 and preferably to a pH of about 5.8, and then filtered to remove the precipitated tarry materials. The acidified solution is treated with a mixture of zinc dust, a water soluble metal bisulfite salt, and carbon, and the resulting clarified liquor is adjusted to a pH of 3.0 to 3.5 thereby precipitating the p-hydroxybenzoic acid. The product is washed with cold water and dried. The p-hydroxybenzoic acid decolorized by this method is a light colored material possessing an average color of APHA #20–35 and forms a clear alkaline solution.

The water soluble metal bisulfite salts referred to above include sodium, potassium, etc. bisulfite. While the following examples disclose the use of sodium bisulfite only, it should be mentioned that substantially similar results are obtained by the use of other water soluble alkali-metal bisulfites.

The decolorization treatment is best effected at temperatures ranging between 15°–45° C. Good results can likewise be obtained when a lower range of temperature is used. However, when the process is carried out at a temperature in excess of 45° C., there is a marked increase in APHA value indicating the desired decolorization of the p-hydroxybenzoic acid can not be effected at high temperatures.

The following examples illustrate methods of carrying out the present invention. It is to be understood, however, that these examples are given by way of illustration and not of limitation.

Unless otherwise indicated, the parts and percentages employed in these examples are expressed in terms of weight.

Example I

Two hundred grams of a diluted carboxylator or reaction liquor which contained 20 grams of p-hydroxybenzoic acid in the form of its potassium salt was acidified to a pH of 5.8 by the addition of concentrated hydrochloric acid. After filtration, the following mixture was added to the filtrate: 0.16 g. (0.8% by weight based on p-hydroxybenzoic acid) of sodium bisulfite, 0.24 g. (1.2%) of zinc dust, and 0.40 g. (2%) of activated carbon. The mixture was stirred for thirty minutes and then filtered. Concentrated hydrochloric acid was added to the filtrate to bring it to a pH of 3.4. Then the solution was cooled to 5–10° C. and filtered. The fine, off-white crystals obtained were washed with cold water and dried at 55–60° C. The product had a color of APHA #33. A clear solution was obtained when the acid was dissolved in a dilute alkaline solution.

Example II

Twenty thousand pounds of a diluted carboxylator liquor which contained 2000 pounds of p-hydroxybenzoic acid as its potassium salt was acidified to a pH of 5.8 with hydrochloric acid and after filtering to remove the precipitated tarry materials, was treated with 1 pound (0.05% based on the weight of p-hydroxybenzoic acid) of sodium bisulfite, 12 pounds (0.60%) of zinc dust, and 40 pounds (2%) of activated carbon. The mixture was agitated for thirty minutes and then filtered. Sufficient concentrated hydrochloric acid was added to the filtrate to bring it to a pH of 3.4. After cooling to 5°–10° C., the acidified mixture was centrifuged. The product after washing with cold water and drying, had a color of APHA #26. A solution of the acid in dilute sodium hydroxide was clear.

*Example III*

A duplication of the procedure described in Example II yielded a product with a color of APHA #20.

In addition to improving the color of p-hydroxybenzoic acid by the process described herein, the quality of the acid is likewise improved by the removal of certain impurities. Since these impurities are acidic in nature, their removal is not indicated by a change in the assay of the p-hydroxybenzoic acid as determined by the usual methods. The higher quality of the product is clearly shown, however, when the acid is used in the preparation of esters. In addition to giving substantially higher yields of lighter colored esters, the absence of impurities permits an additional crop of esters to be removed from the crystallization solvent after it has been used in several crystallization cycles. In sharp contrast, however, when the acid prepared by conventional procedure is used in the preparation of esters, the solvent, after a few crystallization cycles, contained a great deal of tarry material from which no ester could be recovered.

While various modifications of the above invention have been described, it is to be understood that other variations may be made in carrying out this invention without departing from the spirit and scope thereof. Insofar as these modifications or changes are within the scope of the appended claims they are to be considered as part of this invention.

I claim:

1. In a process for preparing substantially pure and color-free p-hydroxybenzoic acid by reacting carbon dioxide and hot, dry potassium phenate to produce the potassium salt of p-hydroxybenzoic acid, the improvement which comprises acidifying an aqueous solution of the potassium salt of p-hydroxybenzoic acid thus obtained to a pH of 5 to 6, filtering to remove the precipitated tarry materials therefrom, treating the filtrate at a temperature ranging between 15°–45° C. with a mixture containing a water soluble alkali metal bisulfite, zinc dust and carbon, filtering the resulting mixture and acidifying the filtrate to obtain the desired product.

2. In a process for preparing substantially pure and color-free p-hydroxybenzoic acid by reacting carbon dioxide and hot, dry potassium phenate to produce the potassium salt of p-hydroxybenzoic acid, the improvement which comprises acidifying an aqueous solution of the potassium salt of p-hydroxybenzoic acid thus obtained to a pH of 5 to 6, filtering to remove the precipitated tarry materials therefrom, treating the filtrate at a temperature ranging between 15°–45° C. with a mixture containing sodium bisulfite, zinc dust and carbon, filtering the resulting mixture and acidifying the filtrate to obtain the desired product.

3. In a process for preparing substantially pure and color-free p-hydroxybenzoic acid by reacting carbon dioxide and hot, dry potassium phenate to produce the potassium salt of p-hydroxybenzoic acid, the improvement which comprises acidifying an aqueous solution of the potassium salt of p-hydroxybenzoic acid thus obtained to a pH of 5 to 6, filtering to remove the precipitated tarry materials therefrom, treating the filtrate at a temperature ranging between 15°–45° C. with a mixture containing potassium bisulfite, zinc dust and carbon, filtering the resulting mixture and acidifying the filtrate to obtain the desired product.

4. In a process for preparing substantially pure and color-free p-hydroxybenzoic acid by reacting carbon dioxide and hot, dry potassium phenate to produce the potassium salt of p-hydroxybenzoic acid, the improvement which comprises acidifying an aqueous solution of the potassium salt of p-hydroxybenzoic acid thus obtained to a pH of about 5.8, filtering to remove the precipitated tarry materials therefrom, treating the filtrate at a temperature of about 25° C. with a mixture containing sodium bisulfite, zinc dust and carbon, filtering the resulting mixture and acidifying the filtrate to obtain the desired product.

5. In a process for preparing substantially pure and color-free p-hydroxybenzoic acid by reacting carbon dioxide and hot, dry potassium phenate to produce the potassium salt of p-hydroxybenzoic acid, the improvement which comprises acidifying an aqueous solution of the potassium salt of p-hydroxybenzoic acid thus obtained to a pH of about 5.8, filtering to remove the precipitated tarry materials therefrom, treating the filtrate at a temperature of about 25° C. with a mixture containing 0.05–0.8% of sodium bisulfite, 0.6–1.2% of zinc dust and about 2% of activated carbon, filtering the resulting mixture and acidifying the filtrate to a pH of about 3 to 3.5 to obtain the desired product.

References Cited in the file of this patent

UNITED STATES PATENTS

| 1,937,477 | Mills et al. | Nov. 28, 1933 |

FOREIGN PATENTS

| 17,075 | Great Britain | of 1888 |
| 105,613 | Great Britain | Apr. 19, 1917 |
| 384,558 | Great Britain | Dec. 8, 1932 |

OTHER REFERENCES

Buehler et al.: Org. Syn. Coll., vol. II (1943), page 342.